3,496,125
ANTICHECKING WAX FOR RUBBER
Jackson S. Boyer, Claymont, Del., and Francois E. Didot, West Chester, Pa., assignors to Sun Oil Company, Philadelphia, Pa., a corporation of New Jersey
No Drawing. Continuation-in-part of application Ser. No. 543,810, Apr. 20, 1966. This application Jan. 16, 1968, Ser. No. 698,103
Int. Cl. C08c 9/14; C08d 9/08
U.S. Cl. 260—4
12 Claims

ABSTRACT OF THE DISCLOSURE

Rubber compositions having improved weathering properties comprising rubber containing 1 to 30 parts by weight per 100 parts of rubber, of an antichecking wax composition comprising 70 to 99 weight percent paraffin wax and 1 to 30 weight percent atactic propylene-ethylene block copolymer containing 1 to 40 percent copolymerized ethylene.

CROSS REFERENCE TO RELATED APPLICATIONS

This application is a continuation-in-part of Ser. No. 543,810, filed Apr. 20, 1966, now abandoned.

BRIEF SUMMARY OF THE INVENTION

This invention relates to improvements in natural and synthetic rubber compositions. The invention particularly relates to rubber compositions having improved resistance to degradation caused by heat, weathering, and ozone cracking.

The present invention particularly relates to an improved antichecking wax composition suitable for use in rubber comprising paraffin wax and atactic propylene-ethylene block copolymers.

BACKGROUND OF THE INVENTION

The term "synthetic rubber" refers broadly to any organic substance which can be prepared synthetically and which has physical properties resembling those of natural rubber. Hereafter the term "rubber" means solid resinous elastomer, either natural or synthetic.

The desirable physical characteristics of rubber are known to be adversely affected by many deteriorating agents including ozone, heat, oxygen, light, fungi, moisture, and certain metallic ions. The most severe of these adverse effects are known to be caused by ozone, heat, and oxygen in the order named. The deterioration of rubber upon exposure to light and particularly to sunlight is well known. The deterioration usually results in the cracking of the rubber surface, conventionally referred to as sun checking, and usually results in a reduction of tensile strength. When these deteriorating effects occur, the rubber is often considered unusable for the purpose intended. It is particularly important where rubber is utilized as a structural element, such as in the side walls of automobile tires, in rubber mountings, rubber footwear, garden hoses, electrical cable coverings, or any other uses wherein the vulcanized rubber may be exposed to ozone, heat and sunlight, that this degradation does not take place. Generally in the rubber art, compositions which are known to inhibit or prevent the abovementioned type of rubber degradation are often referred to as antichecking compositions, e.g., antichecking wax compositions. Deterioration due to sun checking, ozone, and heat results in loss of tensile strength in the rubber with the consequence that the rubber fails as a structural or protective component. Generally it has been observed that rubber compositions which are inherently highly saturated are less susceptible to degradation caused by sunlight, heat, and ozone. It is believed that the amount of olefinic unsaturation in a rubber composition can be directly related to the stability or resistance to degradation of that composition. Normally when evaluating rubber compositions it has been found that the higher the degree of olefinic unsaturation in the rubber composition, the more susceptible that composition is to degradation. Elastomers containing butadiene-styrene and butadiene-acrylonitrile polymers, and natural rubber have been found to be most susceptible to ozone cracking, due possibly to the presence of a greater number of olefinic double bonds. This type of unsaturation in a rubber composition is particularly susceptible to degradation caused by ozone in the atmosphere. Atmospheric ozone concentrations vary from close to zero to ten parts per hundred million (p.p.h.m.) at Minneapolis, Minn., and increase with higher ambient temperatures and increased air movements. Ozone concentrations up to 50 p.p.h.m. have been reported at Los Angeles and in Alaska. Rubber products which must be used in the vicinity of electrical discharge equipment are subjected to ozone concentrations as high as 10,000–15,000 p.p.h.m.

It has been known in the prior art to incorporate directly into the rubber or elastomer composition various oils, waxes, and other organic and inorganic substances and their derivatives, for preventing deterioration. For example, ozone cracking can be prevented by protecting the rubber or rubberlike surface from contact with the atmosphere by means of protective coatings of 4–8 mils of neoprene or 15–20 mils of vinyl polymer. However, these coatings are costly to apply to items such as tires mounted on vehicles. In addition, the coating is subject to rupture, which results in severe ozone cracking due to concentrated stress relaxation of the rubber substrate at the point of rupture. Wrappers based on polymer films or rubber impregnated paper envelopes or special paper wrappings are adequate in preventing cracking by exclusions of air. U.S. Patent Nos. 2,605,250; 2,632,770; 2,705,224; and 3,032,520 disclose the treatment of natural and synthetic rubbers by adding N-N'-disecondary butyl-p-phenylene diamine and certain oxalate derivatives thereof and others to prevent cracking due to weathering involving either static or dynamic stress while subjected to the influence of oxygen, ozone, heat, and/or light.

However, one of the most effective and widely used means of inhibiting rubber degradation (often termed ozone cracking) is the addition of certain petroleum waxes to the rubber compound. It has been known since 1881 (German Patent No. 17,740) that addition of wax to the rubber compound will provide protection against this type of deterioration.

The protection afforded by the wax additives appears to result from the fact that the wax makes its way to the surface of the rubber (blooms) and forms a film which protects by keeping the ozone from contact with the rubber. The mechanism of protection as disclosed above indicates that protection of rubber from ozone by means of wax involves close control of a number of factors. In order that blooming may proceed at all, the solubility of wax in rubber must be controlled. If the rate of blooming is too low, the film will be too thin to act as a barrier to ozone; if the rate is too high, the film will probably flake off in service, and the amount of wax remaining may be inadequate to replace the film.

An added difficulty in the evaluation of the effectiveness of the wax used is the inability to obtain precise correlation between reproducible laboratory conditions of rubber exposure and the non-reproducible conditions which the rubber article will encounter.

It has been reported by Ferris et al. ("Symposium of Effect of Ozone on Rubber," ASTM Tech Spec. Publication No. 229, p. 72), that paraffinic (petroleum) waxes melting in the range of 140°–150° F. are the only waxes effective in protecting rubber in outdoor testing. It was further reported that low melting petroleum waxes, both paraffinic and microcrystalline, are ineffective as degradation inhibitors (antichecking waxes) in rubber compounds in outdoor and/or high temperature environments. Until now low melt petroleum waxes have been ineffective as agents to protect rubber from ozone cracking and degradation, and their use in commercial applications in this respect was not feasible. This problem has now been overcome. It has been discovered that the addition of certain fractions of propylene-ethylene block copolymers to low melt petroleum waxes results in a wax composition which when added to rubber compositions in the prescribed amounts, effectively protects those rubber compositions from the adverse effects of degradation.

DESCRIPTION OF THE INVENTION

Briefly, it has been discovered that an antichecking wax composition comprised of 1–30 weight percent atactic propylene-ethylene block copolymer containing 1–40 weight percent polymerized ethylene and 70–99 weight percent low melting paraffin wax is effective in preventing degradation of rubber when added thereto.

The preferred atactic propylene-ethylene terminal block copolymers of the compositions of the present invention contain 5 to 25 weight percent polymerized ethylene. The preferred concentration range of copolymer to wax in the compositions of the present invention is 5 to 20 weight percent copolymer and 80 to 95 weight percent petroleum paraffin wax.

It has been discovered that the addition of prescribed amounts of atactic propylene-ethylene block copolymer to low melting paraffin wax provides a new antichecking wax composition.

The relatively low melt paraffin waxes usable in the compositions of the present invention typically have melting points in the range of 120–138° F., penetration at 77° F. of from 10–25 (ASTM D–1321), a viscosity at 210° F. of from 37–41 seconds (ASTM D–446). This relatively low melt point paraffin wax may be prepared as follows: A slack wax from the dewaxing of lubricating oil, which can contain about 30% oil, is vacuum distilled and the fraction distilling between about 390°–565° F. at 2 mm. of mercury pressure is collected. This fraction is dissolved in a solvent, preferably a mixture of methyl ethyl ketone and benzene in about equal volumes. Dissolution is performed at an elevated temperature, from about 165°–196° F. being suitable, and advantageously about 6 parts by volume of solvent per part of wax is used. The solution is slowly cooled to a temperature of from 75°–83° F. and the wax which precipitates at this temperature is separated such as by filtration. The solution separated from the precipitated wax is further slowly cooled to a temperature of from 28°–33° F., and the wax which precipitates at this temperature is separated and recovered. Preferably, the wax after separation from solution is washed, such as with the solvent employed for dissolution, preferably at the same temperature as used for filtration, namely from 28°–32° F. and the wax is then separated.

An alternate method of preparing the wax component suitable for the compositions of the present invention is to separate from slack wax two distillate fractions, one distilling under vacuum in the range of from about 390°–475° F. at 2 mm. of mercury pressure and a second fraction distilling in the range of about 450–565° F. at 2 mm. of mercury pressure. As usually occurs, the initial boiling point of the second fraction will overlap the endpoint of the first-mentioned distilled fraction. The lower boiling distillate fraction is dissolved in a solvent as above described and the solution is cooled to a temperature of from 25°–31° F. The wax which precipitates at this temperature is separated as by filtering. The higher boiling distillate fraction is dissolved in a solvent as above described, except that a lower proportion of solvent to wax, say about 4.5 parts of solvent per part of wax, is advantageously used, and the solution is slowly cooled to a temperature of from 72°–82° F. The wax which precipitates at this temperature is separated such as by filtering and the remaining solution is further slowly cooled to a temperature of from 25°–31° F. The wax which precipitates at this latter temperature is separated as by filtering and is mixed with the wax recovered from the lower boiling distillate fraction. This mixture of waxes is particularly useful in the compositions of the present invention. If desired, the two waxes can be washed and dried prior to blending, or the wet waxes may be combined and simultaneously washed and then recovered by removal of the wash liquid. In general, from about 60–75 percent by weight of the paraffin wax will comprise wax from the lower boiling distillate fraction since, as has been found, such mixture gives a wax having properties within those defined for the paraffin wax of the present invention.

The atactic propylene-ethylene copolymers of the compositions of the present invention can be recovered from the low pressure copolymerization of propylene and ethylene with catalyst systems made up of a partially reduced, heavy transition metal halide and a reducing metal-containing compound. This process is described, e.g., see Belgian Patent 538,782 and British Patent 994,416.

In the process the polymers are prepared by polymerizing the constituent monomers in the desired proportions with the aid of certain polymerization catalysts, e.g., see above-mentioned Belgian and British patents. The catalysts are solid, insoluble, reaction products obtained by partially reducing a reducible, heavy transition halide of a Group IVb or VIb or VIII metal with a reducing Group I and III metal-containing material such as an organometallic compound of an alkali, alkaline earth, rare earth metal or zinc. They can also be advantageously prepared by reducing an appropriate metal compound with the aid of metallic aluminum or a mixture of aluminum and titanium, etc. A catalyst of this type can thus be prepared by reducing 1 mole of titanium tetrahalide, usually tetrachloride, to the corresponding trivalent or subtrivalent titanium halide with about 0.2–6.0 moles of aluminum triethyl, triisobutyl or other aluminum alkyl compound in the formula RR′AlX. In this formula, R, R′, and X may alternatively be hydrogen or a halogen, notably chlorine. The reducing is carried out by dissolving each of the two catalyst compoents in an inert solvent, preferably a $C_3$ to $C_{18}$ paraffin such as isopentane or n-heptane, and mixing the two solutions in the proper proportions at temperatures between 0°–300° F. and in the absence of moisture, oxygen, and sulfur impurities. The resulting precipitate in conjunction with some free aluminum alkyl compound is generally considered to constitute the actual active polymerization catalyst. Other organic and metallo-organic coordinators such as tetra ethoxy silane or the dimethyl ethers of polyethylene glycol can be added to form the coordinated complex catalysts usable for alpha-olefin polymerizations. Alternatively, it is possible to carry out the catalyst preparation using only about 0.3–0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1.

The monomers are then contacted with the resulting catalyst in the presence of an inert hydrocarbon solvent. The hydrocarbon solvents that have been shown to be particularly useful for this purpose and particularly for propylene polymerizations include hexane and heptane.

The polymerization is conveniently effected at temperatures of about 100°–250° F. and pressure ranging from about 0–500 p.s.i.g., usually 0–100 p.s.i.g. The catalyst concentration in the polymerization is preferably in the range of about 0.01–0.5 weight percent based on total liquid and the polymer product concentration in the polymerization is preferably kept between about 5–15 weight percent based on total contents so as to allow easy handling of the polymerized mixture. The proper polymer concentration can be obtained by having enough of the inert diluent present or by controlling the polymerization short of 100% conversion.

When the desired degree of polymerization has been reached, a $C_1$ to $C_3$ alkanol such as methyl alcohol, ethanol, or isopropyl alcohol is normally added to the reaction mixture for the purpose of deactivating and partially dissolving the catalyst.

The alpha-olefin polymerization products obtained from the above disclosed methods are mixtures of polymer with different structures and different molecular weights and may be fractionated by solvents, the thus separated fractions being polymers of different structures and different molecular weights. In the polymerization process using an inert hydrocarbon polymerization medium such as pentane, hexane, or heptane, the product obtained will be in two forms: first, that of a high molecular weight solid crystalline polymer powder which is insoluble in the polymerization solvents, and second, a solid predominantly amorphous tacky, solvent soluble, low molecular weight polymer fraction.

Normally the insoluble polymer product is received from the solvent containing the dissloved polymer fractions by centrifuging the slurry or by filtration or both. The recovered insoluble polymer product is often subsequently washed with alcohol and dried to yield a white powdery high molecular weight polymer highly crystalline polymer product. This polymer fraction is normally referred to as the crystalline fraction.

The liquid phase separated from the polymer slurry is often subject to flash evaporation to recoverv the hydrocarbon solvent for reuse and also to recover the solvent soluble polymer product. This product which is soluble in the hydrocarbon solvent is normally referred to as the atactic fraction and is the polymer product which forms a part of the compositions of the present invention.

In general it has been reported that the heptane soluble propylene polymer fraction often referred to as the atactic fraction is composed of three polymer types according to molecular structure, namely, crystalline which is defined above; amorphous polypropylene which is defined as a polymer of a non-stereoregular structure, which polymer is not crystallizable, and stereoblock polymer which has been described as a generally linear alpha-olefin polymer having crystallizable segments of stereoregular structure and non-crystallizable segments of irregular structure in the same molecule. It is this atactic fraction which is usable in the compositions of the present invention.

For the purpose of the present invention the above definition of atactic polypropylene as being synonomous with the heptane soluble fraction of propylene polymer will be adhered to, and the copolymer of the present invention is termed atactic propylene-ethylene block copolymer.

The alpha-olefin copolymer of the compositions of the present invention as previously stated, is comprised of amorphous, stereoblock, and crystalline fractions of a polymer recovered from a specific type of polymerization process and predominately composed of polymerized propylene having block segments of polymerized ethylene in the polymer chain. This polymer product is thereby easily distinguished from the ethylene-propylene copolymer elastomer produced by an entirely different process.

One method of producing the atactic propylene-ethylene block copolymers of the present invention comprises charging to a 50-gallon autoclave having an agitator for mixing disposed therein and a means for controlling heat transfer such as a steam jacket, 25 gallons of an inert liquid hydrocarbon containing 10–100 p.p.m. hydrogen and having dispersed therein a coordinate complex catalyst mixture. The copolymer is made in two stages during the first of which the autoclave is maintained at a temperature in the range of 100°–170° F. Pressure is maintained in the autoclave in the range of 80–120 p.s.i.g. by feeding propylene monomer the introduction of which initiates polymerization of the first segment of the copolymer molecule. When the desired amount of propylene monomer is polymerized the propylene feed is discontinued and the pressure is then maintained by introduction of ethylene or a mixture of propylene and ethylene monomer in a predetermined molar ratio according to the type of copolymer desired. The introduction of the monomer mix initiates the second phase of the copolymer polymerization. The second or final phase of the copolymer polymerization is terminated when the desired amount of monomer mix has been fed to the autoclave. The reaction is thereafter killed by introducing methanol into the hot reaction mixture in sufficient quantities to deactivate the catalyst therein. The deactivated mixture is subsequently withdrawn from the autoclave and the solid or crystalline copolymer product is separated from the polymerization slurry by filtering. The filtrate from this separation containing the atactic propylene-ethylene copolymer in solution is then subject to flash evaporation or steam stripping whereby a solid atactic propylene-ethylene block copolymer is recovered from the polymerization solvent. This is the polymer product which forms a part of the compositions of the present invention.

As previously stated the copolymer product which forms a part of the present invention is the solid predominately amorphous heptane soluble fraction recovered from a two-stage polymerization of propylene and ethylene using a stereospecific catalyst system as hereinabove described. The copolymer product is normally referred to as atactic propylene-ethylene block copolymer.

A simple and suitable method of obtaining a blend of the wax composition of the present invention comprises heating the wax to about 150°–300° F. and adding the desired amount of the propylene-ethylene block copolymer to the molten wax while stirring. The subsequently cooled blend provides a solution of atactive propylene-ethylene block copolymer and wax suitable for the purposes of the present invention. This wax-copolymer blend can then be added to the uncured rubber compositions during the rubber compounding step or at other convenient times by means of a Banbury mixer, a rubber mill or by other means well known to those skilled in the art.

The antichecking wax compositions of the present invention can be blended with rubber prior to curing in quantities of 1–30 parts of wax composition to 100 parts of rubber on a weight basis. The antichecking wax compositions as herein described comprise 70–99 weight percent of paraffin wax having a melting point in the range of 120°–138° F. and 1–30 weight percent of atactic propylene-ethylene block copolymer containing 1–40 weight percent polymerized ethylene as measured by infrared or other known methods.

As an illustration of the effectiveness of the antichecking abilities of the compositions of the present invention, the following comparisons are made:

The atactic propylene-ethylene block copolymer which is used in the examples given below can be prepared by the following method:

A 50-gallon steam jacket autoclave having an agitator for mixing disposed therein is charged with 25 gallons of n-hexane containing 22 p.p.m. of hydrogen and having dispersed therein particles of a catalyst mixture comprising a ratio of 2 moles of diethylaluminum chloride to one mole of titanium trichloride to 0.02 mole of the dimethyl ether of diethylene glycol (diglyme). The catalyst mixture is prepared in the concentration of 0.002 lb. of titanium trichloride per pound of n-hexane. The charged autoclave is subsequently continuously agitated and maintained at 160° F. and pressured up to 100 p.s.i.g. with propylene monomer whereby the first phase of polymerization is initiated. Propylene polymerization is continued until 30.0 lbs. of propylene monomer had been fed to the autoclave. The autoclave temperature is then reduced to 130° F. and the second phase of polymerization begins when the pressure is increased to 118 p.s.i.g. and maintained thereat by feeding a mixture of propylene-ethylene monomer in the ratio of 43 moles of ethylene to 47 moles of propylene until 1.25 lbs. of ethylene monomer and 2.5 lbs. of propylene monomer has been consumed in the reaction. The monomer feed is then discontinued and the reaction is killed by introducing 2 gallons of methanol into the hot reaction mixture.

The crystalline powder is then separated from the mixture by filtration. The filtrate containing the dissolved atactic propylene-ethylene block copolymer is then subjected to steam stripping to distill off the hexane solvent and thereby permits recovery of a substantially solvent-free solid atactic copolymer product.

EXAMPLE I

A rubber composition for use in automobile tires is compounded of the following components:

| | Parts |
|---|---|
| High modulus crepe natural rubber | 100.2 |
| Stearic acid | 1.0 |
| Zinc oxide | 80.0 |
| FEF carbon black | 50.0 |
| Phenyl beta naphthylamine | 1.0 |
| Oxodiethylene benzothiazole-2-sulfenamide | 1.25 |
| Benzothiazyl disulfide | 0.1 |
| Diorthotolylguanidine | 0.2 |
| KO blend insoluble sulfur | 2.0 |

The blend is compounded and molded and cured as the casing and tread of a standard commercial automobile tire by standard procedures well known to those skilled in the art.

EXAMPLE II

To a rubber composition identical to the rubber composition of Example I is added 12 parts of low melt paraffin wax during the compounding step prior to molding and curing the composition in the identical procedure as followed in Example I. The paraffin wax of this composition is characterized as having a melting point of 126° F. (ASTM D87), penetration of 18 at 77° F. (ASTM D1321), and an SUS viscosity at 210° F. of 38.8 (ASTM D446).

EXAMPLE III

To a rubber composition identical to the composition of Example I is added 10 parts of an antichecking wax composition comprised of 80% by weight of a low melt paraffin wax identical to that of Example II and 20 percent by weight of the atactic propylene-ethylene block copolymer described above. The copolymer additive contains 23% by weight copolymerized ethylene. The entire composition was blended, molded, and cured in the same manner as the compositions of Examples I and II.

Black rubber tires made respectively from the rubber compositions of Examples I, II, and III are mounted on the wheel rims of the same automobiles and used for a period of six months in normal automobile driving. At the end of the six-month period each tire is recovered from the automobile and examined. The walls of the tires made from the compositions of Examples I and II are found to contain severe cracks in the side wall portion of the tire. This shows that such compositions are unacceptable for commercial use. The sidewalls of the tire made from the composition of Example III contained no cracks and are considered to be commercially acceptable in that respect.

The improvement achieved in providing a rubber product protected from degradation is amply demonstrated by the above comparison. Example I illustrates the deterioration in the sidewalls of a tire which results when that tire contains no antichecking compositions. Example II illustrates the fact that low melting paraffin wax alone does not provide sufficient protection to the sidewalls of tires. Example III illustrates one composition of the present invention which has demonstrated its effectiveness as an anticheck rubber composition suitable for commercial use.

The compositions of the present invention are equally as effective for use in white sidewall rubber tire compositions, wire coating rubber compositions, and any other application of rubber compositions where a stable rubber protected from deterioration by weathering is required.

We claim:
1. An improved rubber composition comprising a diolefin rubber and 1–30 parts per 100 parts by weight of rubber of an antichecking wax composition consisting essentially of, by weight, 70–99% paraffin wax melting in the range of 120°–138° F. and 1–30% atactic propylene-ethylene copolymer containing 1–40% copolymerized ethylene, said copolymer being the heptane soluble fraction recovered from the copolymerization of propylene and ethylene in the presence of a catalyst comprising (A) a reducible heavy transition halide of a Group IVb or Vb or VIII metal and (B) an organometallic compound of an alkali, alkaline earth, rare earth metal or zinc.

2. A composition according to claim 1 wherein the rubber is natural rubber.

3. A composition according to claim 1 wherein the rubber is styrene-butadiene copolymer.

4. A composition according to claim 1 wherein the rubber is butadiene-acrylonitrile copolymer.

5. A composition according to claim 1 wherein the rubber is polyisoprene.

6. A composition according to claim 1 wherein the rubber is polybutadiene.

7. A composition according to claim 1 wherein the atactic propylene-ethylene copolymer contains 5–25 weight percent copolymerized ethylene.

8. A composition according to claim 2 wherein the atactic propylene-ethylene copolymer contains 5–25 weight percent copolymerized ethylene.

9. A composition according to claim 3 wherein the atactic propylene-ethylene copolymer contains 5–25 weight percent copolymerized ethylene.

10. A composition according to claim 4 wherein the atactic propylene-ethylene copolymer contains 5–25 weight percent copolymerized ethylene.

11. A composition according to claim 5 wherein the atactic propylene-ethylene copolymer contains 5–25 weight percent copolymerized ethylene.

12. A composition according to claim 6 wherein the atactic propylene-ethylene copolymer contains 5–25 weight percent copolymerized ethylene.

References Cited

UNITED STATES PATENTS

| 2,662,864 | 12/1953 | Rumberger | 260—28.5 |
| 3,112,285 | 11/1963 | Phelan et al. | 260—28.5 |
| 3,179,718 | 4/1965 | Wei et al. | 260—889 |
| 3,210,305 | 10/1965 | Coenen et al. | 260—28.5 |
| 3,356,764 | 12/1967 | Gentile | 260—889 |

FOREIGN PATENTS

| 883,524 | 11/1961 | Great Britain. |
| 915,622 | 1/1963 | Great Britain. |

MURRAY TILLMAN, Primary Examiner

M. J. TULLY, Assistant Examiner

U.S. Cl. X.R.

260—28.5, 876, 889